BEST AVAILABLE COPY
D. Matthew,
Steam-Boiler Water-Heater.
A.I. Patented Dec. 11, 1855.
No. 130.
Fig: I.
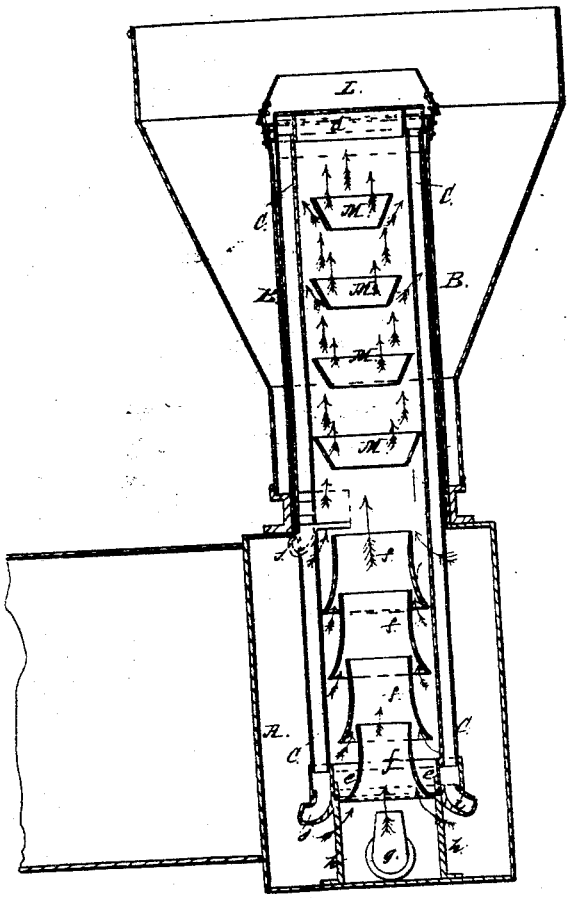
Fig: 2.
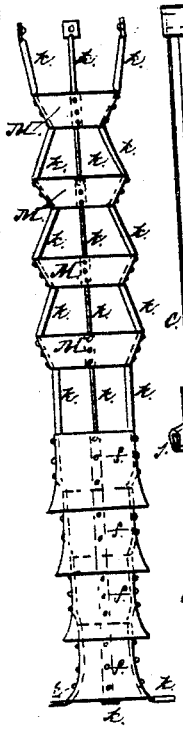
Fig: 3.
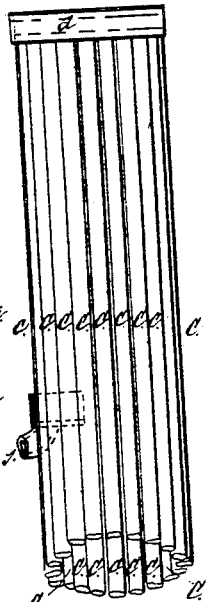
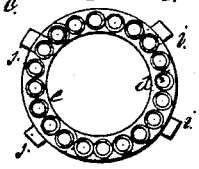
Fig: 4.
Witnesses:
Chas. D. Fuller
Chas. Fobes
Inventor:
David Matthew
No. 130, to original Letters Patent No. 13[illegible] Improvement in Apparatus for Heat[illegible] to Locom[illegible] (Pla[illegible]

BEST AVAILABLE COPY

UNITED STATES PATENT OFFICE.

IMPROVEMENT IN APPARATUS FOR HEATING FEED-WATER FOR LOCOMOTIVE-ENGINES.

Specification of Additional Improvement No. 130, dated December 11, 1855, forming part of Letters Patent No. 13,270, dated July 17, 1855.

*To all whom it may concern:*

Be it known that I, DAVID MATTHEW, of the city of Philadelphia, in the State of Pennsylvania, did obtain Letters Patent of the United States, bearing date July 17, 1855, for an Improvement in Apparatus for Heating Feed-Water to Locomotive Steam Engines to be used in the Smoke-Box of such Locomotive-Engines; and whereas I have invented new and useful improvements to said apparatus, I do hereby declare that the following is a clear and exact description of the construction and operation of said improvements, reference being had to the annexed drawings, making a part of this specification, in which—

Figure 1 is a view of vertical section. Fig. 2 is a view of cones and bars to which they are attached removed from tubes. Fig. 3 is a side view of water-heating tubes. Fig. 4 is a top view of the pipe-rings which the tubes are attached to, which form its top and bottom, with the bottom part removed, and to which the feed-pipes are attached.

Like letters in different figures refer to like parts.

First, the nature of my improvement is in making tubular feed-water heater round and extending it up into the chimney B the whole length of the said chimney, (see Fig. 1;) secondly, in the arrangement of sectional cones M up in the chimney B, so that the said cones are deflecting the current of gases and steam out in contact with the tubular water-heater *c c c*, &c., and at the same time admitting a central current, as shown by arrows, to pass up with its velocity to keep up the necessary powerful draft. This section of cones forces the current out from the center against the heating-pipes *c c c* in the chimney B, increasing the heat and current in contact with tubes or pipes *c c c c*, making them much hotter and preventing the accumulation of luminous or other products of combustion on the heating tubes or pipes.

In the accompanying drawings, Fig. 1 is a vertical section through the center of the water heater pipes *c c c*, &c., sectional draft-pipe *f f f f* or chimney smoke-box A, and chimney B, with the exhaust-pipe *g* in place and sectional cones M in the chimney B. Fig. 2 is a side view of sectional draft pipes or cones *f f f f* and sectional cones M, and braces or fastenings *k k k* removed from the feed-water heater, smoke-box, and smoke-pipe B. Fig. 3 is a side view of feed-water heating pipes *c c c c c*, &c., and top pipe-ring, *d*, with bottom part removed. Fig. 4 is a top view of pipe-ring C, showing the feed-water heating pipes *c c c*, &c., and the feed-pipes *i i* and *j j*.

Like letters in the different figures refer to like parts.

A is the smoke box, exhibiting the front flue-sheet.

B is the chimney above the smoke-box.

*c c c*, &c., are the vertical tubes connected to the top and bottom tubes, *d* and *e*, in the same manner of connecting flues to the flue-sheet of the boiler. Opposite each of these vertical tubes is an opening fitted with a hollow screw-plug to enable the tubes to be taken out or put in when necessary. Four of these holes are used to attach the feed-pipes *i i* and *j j*, there being a division formed in the lower pipe-ring, *e e*, setting off one-half of the tubes for rising and the other for descending tubes, or this number can be changed at pleasure. These top and bottom tubes are best constructed of a round form, as exhibited by drawings; but this form may be changed at the option of the builder to suit the engine.

*f f*, &c., are the sections of the draft or cleaning chimney to cause the heat to enter between all parts of the tubes in the smoke-box A, and the sectional cones M are to force the current of steam and heated gases through and against all parts of the tubes in the chimney B, thus entirely enveloping the feed-water heater in the escaping heat in its passage to the chimney and in its passage through the same.

*g* is the short exhaust-pipes.

*h h* are stays to support and steady the water-heater.

*i i*, Fig. 4, are the feed pipes that connect the pumps.

*j j*, Fig. 4, are the water-pipes leading from the heater to the boiler. The water is contained inside of the tubes. One or more series or rows of tubes may be used or a portion of the tubes made short by making the lower

BEST AVAILABLE COPY pipe ring in two parts where the throttle or steam-pipes in the smoke-box interfere, as shown by the blue lines on drawings, Figs. 1, 3, and 4, without changing the principle of my invention.

What I claim, and desire to secure by Letters Patent, is—

The arrangement of the tubular water-heater sectional cones in relation to each other and to the chimney, as herein set forth.

DAVID MATTHEW.

Witnesses:

CHARLES D. FREEMAN,
CHAS. PARKER.